(12) United States Patent
Hessling-Von Heimendahl et al.

(10) Patent No.: US 10,464,673 B2
(45) Date of Patent: Nov. 5, 2019

(54) LIGHTING SYSTEM OF AN AIRCRAFT CABIN AND AIRCRAFT COMPRISING THE SAME

(71) Applicant: Goodrich Lighting Systems GmbH, Lippstadt (DE)

(72) Inventors: Andre Hessling-Von Heimendahl, Koblenz (DE); Christian Schoen, Mainz (DE); Rolf Broelemann, Salzkotten (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 15/815,757

(22) Filed: Nov. 17, 2017

(65) Prior Publication Data

US 2018/0141663 A1 May 24, 2018

(30) Foreign Application Priority Data

Nov. 18, 2016 (EP) .................................... 16199663

(51) Int. Cl.
| | | |
|---|---|---|
| B60Q 3/00 | (2017.01) | |
| B64D 11/00 | (2006.01) | |
| B60Q 3/46 | (2017.01) | |
| B60Q 3/40 | (2017.01) | |
| B60Q 3/68 | (2017.01) | |
| B64D 47/02 | (2006.01) | |
| B64D 45/00 | (2006.01) | |

(52) U.S. Cl.
CPC ............... *B64D 11/00* (2013.01); *B60Q 3/40* (2017.02); *B60Q 3/46* (2017.02); *B60Q 3/68* (2017.02); *B64D 11/0015* (2013.01); *B64D 47/02* (2013.01); *B60Y 2200/51* (2013.01); *B64D 2011/0038* (2013.01); *B64D 2011/0053* (2013.01); *B64D 2045/003* (2013.01); *B64D 2045/0035* (2013.01); *B64D 2203/00* (2013.01)

(58) Field of Classification Search
CPC .... B64D 11/00; B64D 11/0015; B64D 47/02; B64D 2011/0053; B64D 2045/003; B64D 2045/0035; B64D 2203/00; B60Y 2200/51; B60Q 3/46; B60Q 3/40; B60Q 3/68
USPC ......................................................... 362/471
See application file for complete search history.

(56) References Cited

U.S. PATENT DOCUMENTS

| | | |
|---|---|---|
| 9,243,151 B2 | 1/2016 | Schmitz |
| 2002/0070360 A1 | 6/2002 | Machi |

(Continued)

FOREIGN PATENT DOCUMENTS

| | | |
|---|---|---|
| DE | 10330170 A1 | 2/2005 |
| EP | 2626850 A2 | 8/2013 |

(Continued)

OTHER PUBLICATIONS

Extended European Search Report for International Application No. 16199663.2 dated May 9, 2017, 7 pages.

*Primary Examiner* — Karl D Frech
(74) *Attorney, Agent, or Firm* — Cantor Colburn LLP

(57) ABSTRACT

A lighting system of an aircraft cabin includes a plurality of light units disposed at a plurality of locations within the aircraft cabin, wherein each of the plurality of light units includes at least one infrared light source, with an emission of infrared light across the aircraft cabin resulting from an operation of the at least one infrared light source of the plurality of light units.

11 Claims, 3 Drawing Sheets

(56) References Cited

U.S. PATENT DOCUMENTS

| | | |
|---|---|---|
| 2006/0002110 A1 | 1/2006 | Dowling et al. |
| 2009/0091943 A1 | 4/2009 | Hotary |
| 2010/0189285 A1 | 7/2010 | Niehoff |
| 2014/0176668 A1 | 6/2014 | Boucourt et al. |
| 2014/0192268 A1 | 7/2014 | Petrisor |
| 2017/0113801 A1* | 4/2017 | Brunaux ................ B64D 11/00 |

FOREIGN PATENT DOCUMENTS

| | | |
|---|---|---|
| JP | H114733 A | 1/1999 |
| WO | 2015136307 A1 | 9/2015 |

\* cited by examiner

LIGHTING SYSTEM OF AN AIRCRAFT CABIN AND AIRCRAFT COMPRISING THE SAME

FOREIGN PRIORITY

This application claims priority to European Patent Application No. 16199663.2 filed Nov. 18, 2016, the entire contents of which is incorporated herein by reference.

BACKGROUND

The present invention is in the field of interior aircraft lighting. In particular, the present invention is in the field of lighting systems of aircraft cabins.

Almost all modern aircraft, in particular commercial passenger aircraft, have interior lighting. The interior light units of an aircraft serve a variety of different purposes. Cabin illumination light units are provided for a general illumination of the aircraft cabin, allowing the passengers and crew to be aware of their surroundings and to walk around the cabin. Signalling lights, such as exit sign light units, are provided for conveying information to the passengers and crew, such as safety-critical information about the positions of the emergency exits of the aircraft. Further, targeted lighting is provided for a variety of purposes. For example, reading lights allow passengers to individually adapt the illumination of their personal space.

Despite this extensive use of different kinds of interior aircraft lights, it would be beneficial to add further functionality to interior aircraft lighting systems.

Exemplary embodiments of the invention include a lighting system of an aircraft cabin, comprising a plurality of light units disposed at a plurality of locations within the aircraft cabin, wherein each of the plurality of light units comprises at least one infrared light source, with an emission of infrared light across the aircraft cabin resulting from an operation of the at least one infrared light source of the plurality of light units.

Exemplary embodiments of the invention allow for the emission of infrared light from a plurality of locations across the aircraft cabin. In this way, a wide spread "illumination" with infrared light across the aircraft cabin may be achieved. This infrared light may be used for inspecting the aircraft cabin during night flights without the need to operate visible light sources and, thus, without the need to disturb the passengers.

According to a further embodiment, the at least one infrared light source is at least one infrared light emitting diode. The at least one infrared light source may emit the majority of light in the near infrared band, i.e. in the wavelength band of 770 nm to 1000 nm. In particular, the at least one infrared light source may emit at least 80%, in particular at least 90% of its lighting energy in the near infrared band.

According to a further embodiment, the at least one infrared light source of the plurality of light units are jointly controllable. In other words, the infrared light sources of the plurality of light units may be switched between an on state and an off state in a joint manner. In this way, a comprehensive illumination of infrared light across the aircraft cabin may be achieved in a particularly convenient manner.

According to a further embodiment, the at least one infrared light source of each of the plurality of light units is individually controllable. In other words, each of the plurality of light units is individually switchable between an on state and an off state of the at least one infrared light source.

In this way, the provision of infrared light may be effected in a location-specific manner, with an inspection of the aircraft cabin in a location-specific manner being facilitated therewith.

According to a further embodiment, the lighting system further comprises an infrared camera, with the infrared camera being adapted to take photos and/or videos of the aircraft cabin in the absence of visible light. The infrared camera ma be adapted to take photos and/or videos of the aircraft cabin upon operation of the at least one infrared light source of one or more of the plurality of light units. An inspection of the aircraft cabin with infrared light may be carried out in an automated manner without requiring the crew to carry out said inspection manually. The photos and/or videos taken by the infrared camera may be looked at by the pilots and/or air crew in a separate location, such as in the cockpit and/or a flight crew room. Also, the photos and/or videos may be transmitted towards air traffic control on the ground. It is pointed out that the inspection of the aircraft cabin may also be carried out without such an infrared camera, for example by the use of night vision goggles or similar devices.

The lighting system may comprise a control unit controlling the plurality of light units. In particular, the control unit may control the at least one infrared light source for each of the plurality of light units. The control unit may be arranged at any suitable location in the aircraft and may be configured to receive commands from one or more of the pilots, the flight crew, and the on-board computer. The control unit may control the plurality of light units on the basis of these commands.

According to a further embodiment, each of the plurality of light units further comprises at least one visible light source. In particular, the light units may be configured to replace previous light units that emitted only visible light. In other words, the light units may be adapted to occupy sockets previously occupied by light units emitting only visible light. In this way, the previous functionality of emitting visible light is maintained, while the additional infrared functionality may be provided without the need to install additional light units in the aircraft cabin, i.e. without requiring additional space and/or wiring.

According to a further embodiment, the at least one visible light source is at least one LED, emitting visible light in operation.

According to a further embodiment, each of the plurality of light units has a generally longitudinal extension along a lengthwise extension of the aircraft cabin. In a particular embodiment, each of the plurality of light units has a length of between 20 cm and 250 cm, in particular of between 30 cm and 150 cm, in the lengthwise extension of the aircraft cabin. The given ranges for the length of the light units have been found to be a good compromise between covering the aircraft cabin with a reasonable number of light units and providing a good level of granularity for a location-selective provision of light. Also, the given ranges for the length of the light units allow for a convenient replacement of prior art halogen tube lights with the light units as described herein.

According to a further embodiment, the lighting system comprises between 20 and 200 light units disposed at the plurality of locations within the aircraft cabin. In particular, the lighting system may comprise between 20 and 200 light units disposed in succession along the lengthwise extension of the aircraft cabin.

According to a further embodiment, the plurality of light units have a plurality of visible light LEDs. In particular, groups of 3-7 visible light LEDs may form local light mixture cells/modules. The spacings between the centers of adjacent local light mixture cells/modules may be between 8 and 52 mm. At least every 10th local light mixture cell/module may be provided with an infrared LED or may have an infrared LED positioned next to it.

According to a further embodiment, the plurality of light units may comprise a plurality of tube-like, flexible light units that are bendable along/around different geometrical shapes, such as along/around free-form contours within the aircraft cabin. For example, such a tube-like, flexible light unit may be bent to be arranged along a stairwell of the aircraft cabin. Such tube-like, flexible light units may have a length of between 20 cm and 250 cm.

According to a further embodiment, the plurality of light units comprise a plurality of ceiling light units, disposed in an upper portion of the aircraft cabin. In this way, the light units are well-adapted to emit infrared light into an upper portion of the aircraft cabin, particularly towards the ceiling of the aircraft cabin. The infrared light may be reflected by the ceiling of the aircraft cabin and may be dispersed across the aircraft cabin therefrom.

According to a further embodiment, the plurality of ceiling light units are sized to fit between overhead baggage compartments and a ceiling of the aircraft cabin. In particular, the plurality of ceiling light units may be mountable between the overhead baggage compartments and the ceiling of the aircraft cabin. In this way, the plurality of light units are arranged in a position that allows for an effective emission of infrared light, while being well-integrated into the aircraft cabin design and being substantially blocked from the passengers' view.

According to a further embodiment, the plurality of light units comprise a plurality of wall light units, disposed in a side portion of the aircraft cabin. In this way, the light units are well-adapted to emit infrared light into a side portion of the aircraft cabin, particularly towards the side wall of the aircraft cabin, from where it may be reflected across the aircraft cabin. According to a further embodiment, the plurality of wall light units are sized to fit between overhead baggage compartments and a side wall of the aircraft cabin and the plurality of wall light units are mountable between the overhead baggage compartments and the side wall of the aircraft cabin.

According to a further embodiment, the plurality of light units comprise a plurality of accent light units disposed along edges or sharp contours of the aircraft cabin. In particular, such accent light units may be disposed at structures such as door frames, overhead panels, etc. The arrangement of light units at these exposed positions allows for an emission of infrared light into the aircraft cabin in a particularly un-impeded manner.

According to a further embodiment, each of the plurality of light units comprises at least one UV light source. With UV light, the emission of the light sources is not directly visible to the passengers. Thus, the light units, when operated with the UV light sources only, are not perceived as such. Instead, illumination from places that do not resemble light units is provided. Examples of such places are emergency path markings, light emitting walls/ceiling, etc., as will be laid out below. The origin of the visible light may be spatially de-coupled from the location of the light units. By providing the light units with UV light sources in addition to infrared light sources, two lighting functions in addition to the provision of visible light may be achieved in the same light units.

According to a further embodiment, the at least one UV light source of each of the plurality of light units is individually controllable. In this way, a location-selective provision of indirect illumination of the aircraft cabin via UV light is made possible. By making each of the plurality of light units individually controllable with respect to the operation of their UV light sources, above described effects of UV light sources may be made use of/adapted depending on the location within the aircraft cabin. The aircraft cabin may be provided with UV light in a location-selective manner, which makes the transformation of the UV light into visible light and the resulting indirect illumination of the aircraft cabin in a location-selective manner possible.

The at least one UV light source of each of the plurality of light units is individually controllable. This means that each of the plurality of light units is individually controllable with respect to the operation of the at least one UV light source thereof. In other words, each of the plurality of light units is individually controllable with respect to the on/off switching of the at least one UV light source of the light unit in question. In yet other words, each of the plurality of light units is individually switchable between an on state and an off state of the at least one UV light source. If a light unit has more than one UV light source, all UV light sources of the light unit may be switched on/off jointly. However, these more than one UV light sources of the given light unit are independently controllable from the UV light sources of the other light units.

According to a further embodiment, the at least one UV light source is at least one UV light emitting diode (UV LED). The at least one UV light source may emit the majority of light in the UVA band, i.e. in the wavelength band of 315 nm to 400 nm. In particular, the at least one UV light source may emit at least 80%, in particular at least 90% of its lighting energy in the UVA band.

According to a further embodiment, the UV light sources of the plurality of light units may have a joined UV light emission power of between 10 W and 50 W, in particular of between 15 W and 30 W, further in particular of about 20 W.

According to above discussed embodiments of the light units comprising ceiling light units/wall light units, such positioning allows for transforming the UV light into visible light via according elements in the top portion of the aircraft, in particular at the ceiling of the aircraft cabin, or in the side portion of the aircraft, in particular at the side wall of the aircraft cabin.

According to a further embodiment, the lighting system further comprises a plurality of photo luminescent emergency path markings, with the plurality of photo luminescent emergency path markings being chargeable by operating the at least one UV light source of the plurality of light units and with the plurality of photo luminescent emergency path markings emitting visible light pursuant to being charged by the at least one UV light source of the plurality of light units. The emission of UV light towards the photo luminescent emergency path markings is a particularly efficient way of charging the plurality of photo luminescent emergency path markings. As compared to charging with visible light, UV light allows for a much quicker charging of the photo luminescent emergency path markings, because the most commonly used photo luminescent materials have a much better absorption of UV light than of visible light. Due to this accelerated charging, lengthy charging times of photo luminescent emergency path markings with visible light, as were required in previous approaches, can be eliminated. In particular, operating the aircraft cabin lighting system with visible light sources over night for charging the photo luminescent emergency path markings, as was sometimes required in previous approaches, may be eliminated.

Further, it may be possible to shorten the downtime of aircraft between flights, which was sometimes limited by the charging of photo luminescent emergency path markings in previous approaches. The photo luminescent emergency path markings may in particular be floor markings, such as strips disposed along the one or more aisles of the aircraft cabin. The photo luminescent emergency path markings may be fluorescent emergency path markings and/or phosphorescent emergency path markings.

According to a further embodiment, the lighting system further comprises a plurality of indirect illumination regions disposed at various second locations within the aircraft cabin, with each of the indirect illumination regions comprising a photo luminescent substance for emitting visible light pursuant to being charged by the at least one UV light source of the plurality of light units. The indirect illumination regions, comprising a photo luminescent substance, are an effective way of transforming the UV light, emitted by the plurality of light units, into visible light and thus achieving an indirect illumination of the aircraft cabin. As compared to the emergency path markings discussed above, which have a signalling function to the passengers, the indirect illumination regions may be used either for signalling purposes or for the purpose of a general illumination of the aircraft cabin.

According to a further embodiment, the photo luminescent substance is one of a photo luminescent paint and a photo luminescent coating applied to an interior structure of the aircraft cabin. In particular, the photo luminescent paint or the photo luminescent coating may be applied to a cabin wall, a cabin ceiling, an outer overhead baggage compartment surface, or any other suitable interior structure of the aircraft cabin. The photo luminescent paint or the photo luminescent coating may be a fluorescent and/or phosphorescent paint/coating. The photo luminescent paint or the photo luminescent coating may be invisible/non-recognizable to the human eye. In the absence of UV light, the passengers may not see the border between an indirect illumination region and an adjacent part of the aircraft cabin without the paint/coating.

According to a further embodiment, the photo luminescent substance is provided in the plurality of indirect illumination regions in one of a continuous manner and a patterned manner. By providing the photo luminescent substance in a continuous manner, a uniform illumination via the respective indirect illumination region may be achieved. With the photo luminescent substance being applied in a patterned manner, the indirect illumination regions may be configured to convey information, such as with the photo luminescent substance forming symbols, e.g. the airline logo, or for providing a comforting environment to passengers, such as via the resemblance of stars in the sky on the ceiling of the aircraft cabin, or for other purposes.

According to a further embodiment, the lighting system further comprises a control unit for controlling the plurality of light units, wherein the control unit is configured to provide a selective illumination of the aircraft cabin with infrared light and, if UV light sources are present, with UV light. The control unit may be configured to achieve the selective illumination with infrared light by putting the at least one infrared light source of a subset of the plurality of light units into an on state. The provision with UV light may be achieved via a subset of the plurality of indirect illumination regions by putting the at least one UV light source of a subset of the plurality of light units in an on state. In this way, above described uses and effects of infrared and/or UV light may be adapted to a particular desired operating scenario at any given time via the control unit.

Exemplary embodiments of the invention further include a lighting system of an aircraft cabin, comprising a plurality of light units disposed at a plurality of locations within the aircraft cabin, wherein each of the plurality of light units comprises at least one UV light source and wherein the at least one UV light source of each of the plurality of light units is individually controllable. In this way, exemplary embodiments of the invention may relate to a lighting system with light units that have at least one UV light source each and that do not have infrared light units. In other words, the lighting system according to exemplary embodiments of the invention may have UV lighting functionality, potentially in combination with visible lighting functionality, without having infrared lighting functionality. The modifications, additional features and effects discussed above with respect to the UV portion of the lighting system having infrared functionality are applicable to a lighting system without infrared functionality in an analogous manner.

Exemplary embodiments of the invention further include an aircraft comprising an aircraft cabin for seating passengers and a lighting system in accordance with any of the embodiments described above. The aircraft may by an air plane, in particular a passenger air plane, further in particular a large commercial passenger air plane, or a helicopter. The modifications, additional features and effects, described above with respect to the lighting system, apply to the aircraft in an analogous manner.

Further exemplary embodiments of the invention are described with respect to the accompanying figures, wherein.

Figure 1:
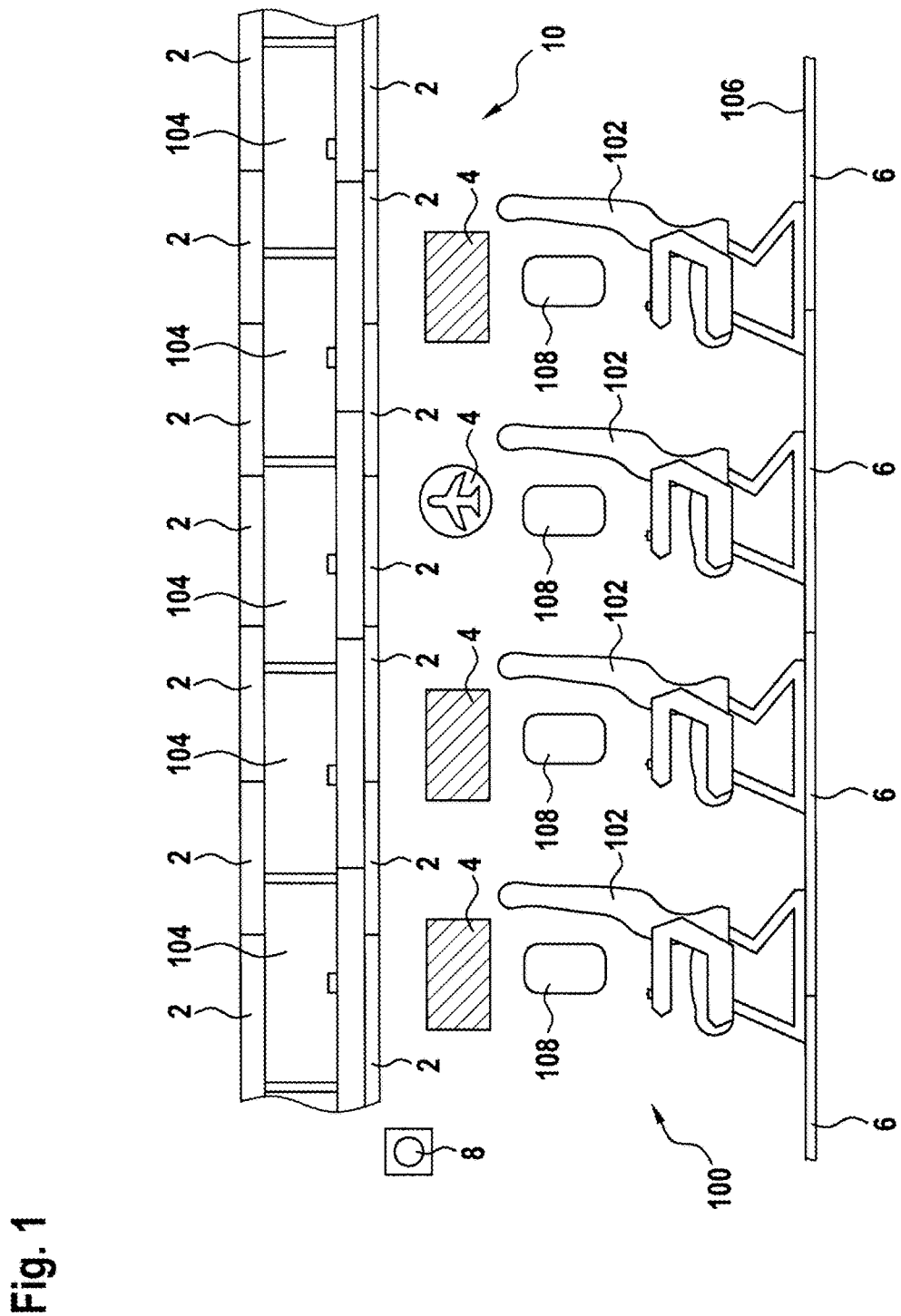
FIG. 1 shows a section of an aircraft cabin, equipped with a lighting system in accordance with an exemplary embodiment of the invention, in a side view.

FIG. 1 shows a section of an aircraft cabin 100, the aircraft cabin 100 being equipped with a lighting system 10 in accordance with an exemplary embodiment of the invention. The aircraft cabin 100 has those structures/elements that are commonly encountered in an aircraft cabin of a large passenger aircraft. For illustrative purposes, a plurality of passenger seats 102 are depicted. The passenger seats 102 are shown to be arranged on a floor 106 of the aircraft cabin 100. Each of the passenger seats 102 is depicted next to a window 108, which allows the passengers to view the outside of the aircraft. Further, a plurality of overhead baggage compartments 104 are shown, which provide storage space to the passengers.

The lighting system 10 has a plurality of light units 2. In the exemplary embodiment of FIG. 1, two kinds of light units 2 are shown. On the one hand, a plurality of light units 2 are arranged underneath the overhead baggage compartments 104, in particular arranged at the side wall of the aircraft cabin 100 and mounted at least partially between the side wall of the aircraft cabin 100 and the overhead baggage compartments 104. On the other hand, a plurality of light units 2 are arranged on top of the overhead baggage compartments 104, in particular at least partially arranged between the overhead baggage compartments 104 and the ceiling of the aircraft cabin 100. The former kind of light units may be referred to as wall light units, while the latter kind of light units may be referred to as ceiling light units.

The light units 2 have a longitudinal extension along the aircraft cabin 100. In other words, their extension along the length of the aircraft cabin 100 is much greater than their extension in the width-wise and the height-wise dimension of the aircraft cabin 100. In the particular embodiment of FIG. 1, the light units have a length-wise dimension of about 50 cm.

Each of the light units 2 comprises a plurality of visible light LEDs, at least one UV LED, and at least one infrared LED. In this way, each of the light units 2 is able to emit visible light, UV light, and infrared light. Further in particular, each of the plurality of light units 2 is individually controllable with respect to these different kinds of light output. It is possible for any given light unit 2 to emit one of or any subset of visible light, UV light, and infrared light at any point in time. In other words, each of the visible light emission functionality, the UV light emission functionality, and the infrared light emission functionality may be individually switched on and off for each of the plurality of light units 2. It is, however, pointed out that it is also possible that each of the light units 2 may have infrared lighting functionality only or infrared and visible lighting functionality only.

The exemplary lighting system 10 of FIG. 1 further comprises a plurality of indirect illumination regions 4. The indirect illumination regions 4 have photo luminescent paint applied to the side wall of the aircraft cabin 100. In the exemplary embodiment of FIG. 1, the indirect illumination regions 4 have fluorescent paint applied to the side wall of the aircraft cabin. The fluorescent paint emits visible light pursuant to being charged by UV light. The fluorescent paint further has a very fast reaction time, starting and stopping the emission of visible light very shortly after receiving UV light/no longer receiving UV light. For three out of the four depicted indirect illumination regions 4, the photo luminescent paint is applied in a continuous manner across the indirect illumination regions 4, thus forming a continuous source of indirect illumination across the respective indirect illumination regions. The fourth indirect illumination region 4 has photo luminescent paint applied to the side wall of the aircraft cabin 100 in a discontinuous manner. In particular, the photo luminescent paint is applied in a patterned manner, with the pattern representing an airline logo in the exemplary embodiment of FIG. 1. It is apparent that the plurality of indirect illumination regions thus may form sources of uniform indirect illumination or may have any kind of pattern, such as a geometric pattern, a symbol, etc.

The lighting system 10 further comprises a plurality of emergency path markings 6, disposed along the floor 106 of the aircraft cabin 100. The emergency path markings 6 are also photo luminescent. In the particular embodiment of FIG. 1, the emergency path markings 6 are phosphorescent. The phosphorescent emergency path markings allow for being charged with UV light and/or visible light and for emitting visible light over an extended period of time, after the charging has been discontinued. The emergency path markings 6 of the exemplary embodiment of FIG. 1 are charged much more rapidly by UV light than by visible light.

It is pointed out that the lighting system 10 may also be provided without the indirect illumination regions 4 and/or without emergency path markings 6. This is in particular the case, when the plurality of light units 2 have only infrared functionality or only infrared and visible lighting functionality.

The lighting system 10 of FIG. 1 further comprises an infrared camera 8. The infrared camera 8 is mounted to the side wall of the aircraft cabin 100. It may also be mounted to other structures of the aircraft cabin 100, such as to a transverse wall, dividing the aircraft cabin 100 into multiple cabin portions.

The operation of the lighting system 10 of FIG. 1 is now described. In a first operating mode, the plurality of light units 2 emit visible light for illuminating the aircraft cabin 100.

In a second operating mode, the plurality of light units 2 emit UV light into the aircraft cabin 100. Pursuant to receiving this UV light, the plurality of indirect illumination regions 4 emit visible light, with three of the indirect illumination regions 4 forming extended sources of visible light along the side wall of the aircraft cabin 100 and with the fourth indirect illumination region forming a source of visible light in the form of the airline logo. Also, pursuant to receiving UV light from the plurality of light sources 2, the emergency path markings 6 absorb said UV light. While they emit visible light as a response to receiving UV light, they also store part of the received energy and emit visible light also after the emission of UV light by the plurality of light units 2 is discontinued. The UV light sources of the plurality of light units 2 are individually controllable for each of the plurality of light units 2. Accordingly, via a suitable control of the plurality of light units 2, it is possible to stimulate only selected ones of the plurality of indirect illumination regions 4, in particular by operating those light units 2 that are in close proximity to the respectively desired indirect illumination regions 4. Accordingly, a location-selective provision of indirect light via the plurality of indirect illumination regions 4 may be achieved.

In a third operating mode, the plurality of light units emit infrared light across the aircraft cabin 100. Simultaneously, the infrared camera 8 is operated. In this way, the infrared camera 8 may take photos and/or videos of the aircraft cabin 100 on the basis of the infrared light emitted by the light units 2.

The lighting system 10 may have further operating modes. In particular, any combination of emission of visible light, emission of UV light, and emission of infrared light may be provided for a desired operating mode. Further in particular, due to the plurality of light units 2 being individually controllable, various sub-modes may be provided, wherein the desired combination of light emission is provided in a location-specific manner.

Figure 2:
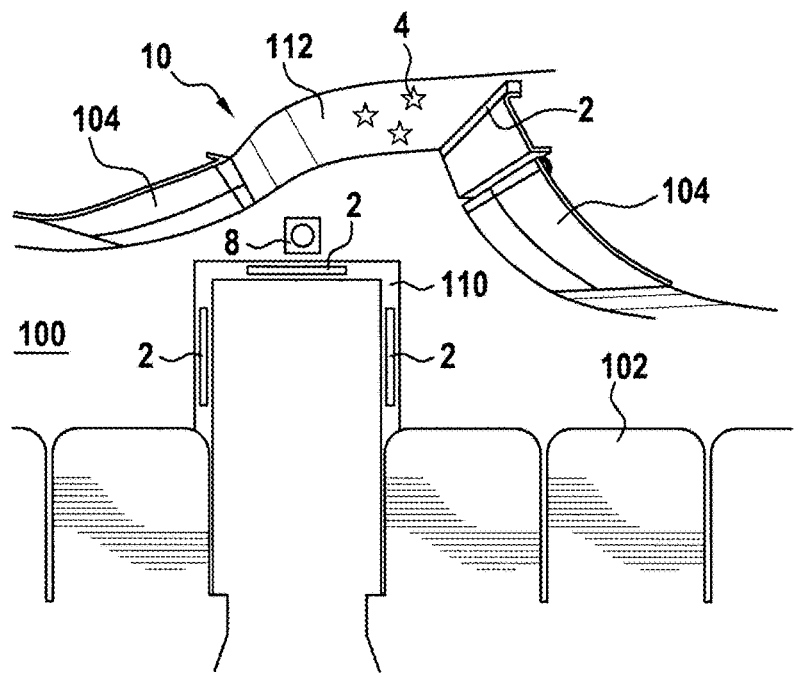
FIG. 2 shows a section of an aircraft cabin, equipped with a lighting system in accordance with an exemplary embodiment of the invention, in a front view.

FIG. 2 shows a section of an aircraft cabin 100 in a front view. Again, the aircraft cabin 100 is equipped with a lighting system 10 in accordance with exemplary embodiments of the invention. Elements corresponding to the exemplary embodiment of FIG. 1 are provided with the same reference numerals, and reference is made to their description with respect to FIG. 1. As compared to FIG. 1, the aircraft cabin 100 of FIG. 2 is further depicted with an aircraft cabin door 110 and a ceiling 112 of the aircraft cabin 100.

In the exemplary embodiment of FIG. 2, the lighting system 10 comprises three light units 2 that are provided along the frame of the aircraft cabin door 110 as accent light units. Their design and operation is analogous to the plurality of light units 2, discussed above with respect to FIG. 1.

In the exemplary embodiment of FIG. 2, an indirect illumination region 4 is provided on the ceiling 112 of the aircraft cabin 100. This indirect illumination region 4 consists of a plurality of star-shaped symbols, provided on the ceiling 112 in fluorescent paint. Upon receiving UV light from the light units 2, in particular from the ceiling illumination light unit 2 in close proximity to the indirect illumination region 4 in question, the stars emit visible light, resembling a starry sky to the passengers.

In the exemplary embodiment of FIG. 2, the infrared camera 8 is disposed above the aircraft cabin door 110 and at the wall through which the aircraft cabin door provides an opening.

Figure 3:
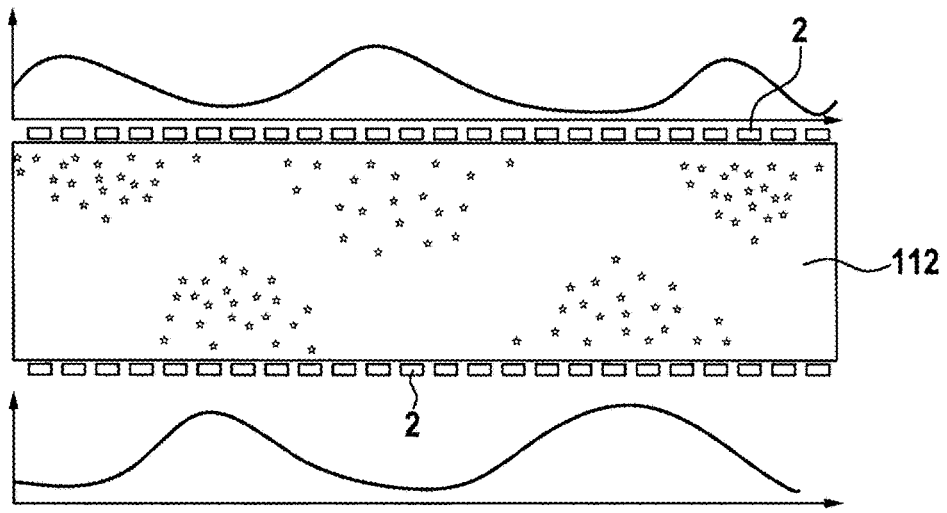
FIG. 3 shows a schematic bottom view of a ceiling of an aircraft cabin, illuminated by a lighting system in accordance with exemplary embodiments of the invention.

FIG. 3 shows a bottom view of a ceiling 112 of an aircraft cabin, when a lighting system in accordance with exemplary embodiments of the invention is operated. In the exemplary embodiment of FIG. 3, the ceiling 112 is provided with a large number of star-shaped symbols of fluorescent paint, distributed in a roughly uniform distribution across the ceiling 112. The star-shaped symbols are arranged in various indirect illumination regions. The UV light sources of the plurality of light units 2, which are disposed along the right aisle of an aircraft, shown towards the bottom of FIG. 3, and along the left aisle of an aircraft, shown towards the top of FIG. 3, are operated in accordance with the light emission levels indicated by the curves on the top and on the bottom of FIG. 3. Although the star-shaped symbols are present throughout the entire ceiling 112, only those star-shaped symbols light up that are close to light units 2 with high UV emission levels. Accordingly, a location-selective illumination of the aircraft cabin is achieved.

Figure 4:
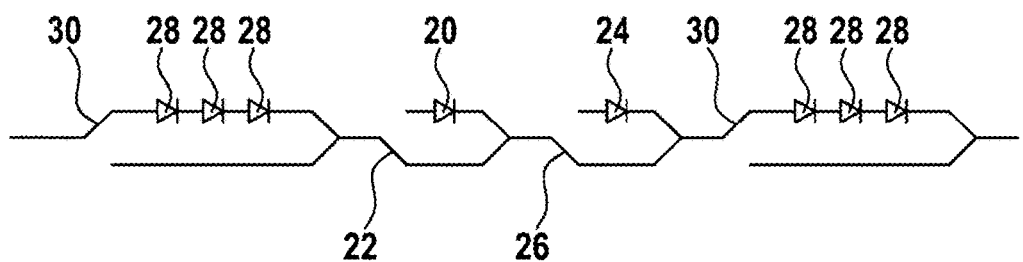
FIG. 4 shows a circuit diagram of a light unit to be used in a lighting system in accordance with exemplary embodiments of the invention.

FIG. 4 shows a circuit diagram of a light unit to be used in a lighting system in accordance with exemplary embodiments of the invention. The light unit 2 has a series connection of various light sources, in particular a series connection of various LEDs. In the exemplary embodiment of FIG. 4, the light unit 2 has one UV LED 20, one infrared LED 24 and six visible light LEDs 28. Further, the light unit 2 has a first switch 22, associated with the UV LED 20, a second switch 26, associated with the infrared LED 24, and two third switches 30, each associated with three visible light LEDs 28, respectively.

Via the first switch 22, the second switch 26, and the third switch 30, respective parallel connections around the UV LED 20, the infrared LED 24, and the visible light LEDs 28 can be made conductive, thus taking the desired LED(s) out of the series connection of the light unit 2. In this way, the emission of UV light, the emission of infrared light, and the emission of visible light can be selected independently from each other. In the depicted operating state of FIG. 4, the visible light LEDs 28 are in the on state, while the UV LED 20 and the infrared LED 24 are in the off state. It is pointed out that the circuit diagram of FIG. 4 is only exemplary and illustrative. Any number of light sources and any suitable connection of those light sources may be employed for the light unit in question.

The visible light LEDs 28 may be white LEDs. They may also be a combination of colored LEDs, such as red, green, blue, and amber white LEDs.

Figure 5:
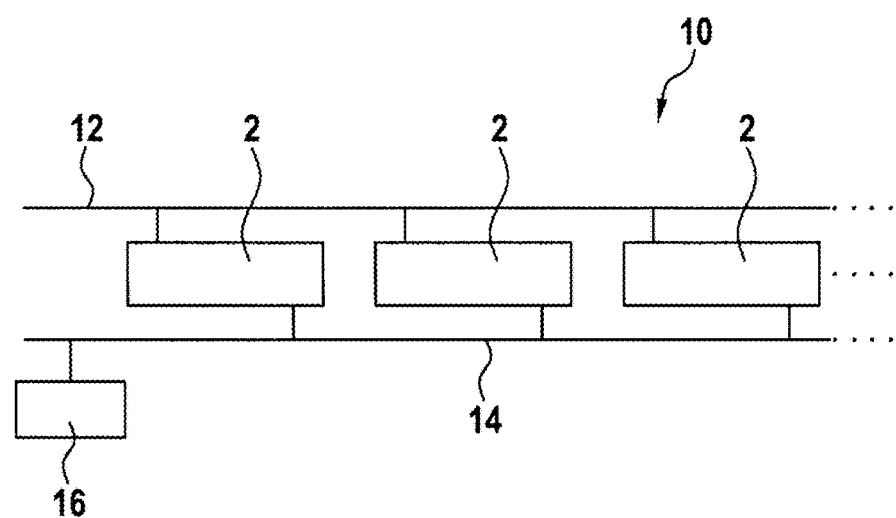
FIG. 5 shows a block diagram of a lighting system in accordance with exemplary embodiments of the invention.

FIG. 5 shows a block diagram of a lighting system 10 in accordance with an exemplary embodiment of the invention. The lighting system 10 is shown to have three light units 2. However, as indicated by the dots in FIG. 5, a greater number of light units may actually be present in the lighting system 10. The light units 2 are coupled to a power distribution network 12, from which they can draw electrical power for illuminating their light sources. Further, the light units 2 are coupled to a control communication bus 14, which in turn is coupled to a control unit 16. The control unit 16 may thus control the light units 2 via the control communication bus 14 and cause the light units 2 to be in any of the operating states described above.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A lighting system of an aircraft cabin, comprising:
a plurality of light units disposed at a plurality of locations within the aircraft cabin,
wherein each of the plurality of light units comprises at least one infrared light source, with an emission of infrared light across the aircraft cabin resulting from an operation of the at least one infrared light source of the plurality of light units,
wherein the at least one infrared light source of each of the plurality of light units is individually controllable,
wherein each of the plurality of light units comprises at least one UV light source and wherein the at least one UV light source of each of the plurality of light units is individually controllable, and
wherein each of the plurality of light units further comprises at least one visible light source; and
a control unit coupled to the plurality of light units, the control unit configured to provide a location-selective illumination of the aircraft cabin with infrared light and configured to provide a location-selective provision of UV light in the aircraft cabin.

2. The lighting system according to claim 1, further comprising an infrared camera, with the infrared camera being adapted to take photos and/or videos of the aircraft cabin in the absence of visible light.

3. The lighting system according to claim 1, wherein each of the plurality of light units has a generally longitudinal extension along a lengthwise extension of the aircraft cabin, with each of the plurality of light units in particular having a length of between 20 cm and 250 cm in the lengthwise extension of the aircraft cabin.

4. The lighting system according to claim 1, wherein the plurality of light units comprise a plurality of ceiling light units, disposed in an upper portion of the aircraft cabin, and/or a plurality of wall light units, disposed in a side portion of the aircraft cabin.

5. The lighting system according to claim 4,
wherein the plurality of ceiling light units are sized to fit between overhead baggage compartments and a ceiling of the aircraft cabin and wherein the plurality of ceiling light units are mountable between the overhead baggage compartments and the ceiling of the aircraft cabin, or
wherein the plurality of wall light units are sized to fit between overhead baggage compartments and a side wall of the aircraft cabin and wherein the plurality of wall light units are mountable between the overhead baggage compartments and the side wall of the aircraft cabin.

6. The lighting system according to claim 1, wherein the plurality of light units comprise a plurality of accent light units disposed along edges or sharp contours, such as door frames, of the aircraft cabin.

7. The lighting system according to claim 1, further comprising a plurality of photo luminescent emergency path markings, with the plurality of photo luminescent emergency path markings being chargeable by operating the at least one UV light source of the plurality of light units and with the plurality of photo luminescent emergency path markings emitting visible light pursuant to being charged by the at least one UV light source of the plurality of light units.

8. The lighting system according to claim 1, further comprising a plurality of indirect illumination regions disposed at various second locations within the aircraft cabin, with each of the indirect illumination regions comprising a photo luminescent substance for emitting visible light pursuant to being charged by the at least one UV light source of the plurality of light units.

9. The lighting system according to claim 8, wherein the photo luminescent substance is one of a photo luminescent paint and a photo luminescent coating applied to an interior structure of the aircraft cabin, such as a cabin wall, a cabin ceiling, or an outer overhead compartment surface.

10. The lighting system according to claim 8, wherein the photo luminescent substance is provided in the plurality of indirect illumination regions in one of a continuous manner and a patterned manner.

11. An aircraft comprising:
an aircraft cabin for seating passengers, and
a lighting system, the lighting system including:
   a plurality of light units disposed at a plurality of locations within the aircraft cabin,
   wherein each of the plurality of light units comprises at least one infrared light source, with an emission of infrared light across the aircraft cabin resulting from an operation of the at least one infrared light source of the plurality of light units and wherein the at least one infrared light source of each of the plurality of light units is individually controllable,
   wherein each of the plurality of light units comprises at least one UV light source and wherein the at least one UV light source of each of the plurality of light units is individually controllable, and
   wherein each of the plurality of light units further comprises at least one visible light source; and
   a control unit coupled to the plurality of light units, the control unit configured to provide a location-selective illumination of the aircraft cabin with infrared light and configured to provide a location-selective provision of UV light in the aircraft cabin; and
   a control unit coupled to the plurality of light units, the control unit configured to provide a selective illumination of the aircraft cabin with infrared light by putting the at least one infrared light source of a subset of the plurality of light units into an on state.

* * * * *